Patented Jan. 30, 1945

2,368,578

UNITED STATES PATENT OFFICE 2,368,578

PROCESS OF PRODUCING MUSKLIKE PREPARATIONS

Charles V. Sparhawk, Sparkill, N. Y.

No Drawing. Application June 13, 1941,
Serial No. 397,935

8 Claims. (Cl. 167—94)

The present invention relates to the preparation of a musk-like material, and it particularly relates to the preparation of musk-like materials from animal sources.

It has not been readily possible to prepare in a satisfactory commercial manner musk-like materials from animals because of the impurities and other ingredients contained in the animal tissues or organisms, which disadvantageously affect the quality of the material obtained and yield of the material.

Where attempts, for example, have been made to secure or produce musk-like materials from various animals such as, for example, from the European musk deer or from the Arctic musk ox, a product is obtained of low commercial value which cannot be readily separated from the blood, hair and other adulterations which may be found therein without disadvantageously affecting the quality of the material.

Although the American muskrat occurs quite widely in this country and is raised and developed for its fur, it has not been found commercially possible to derive musk-like materials of commercial value from the glands of this animal, and the glands of this animal have usually been thrown away as a waste product, since their presence in the carcass when sold for animal food makes the carcass unpalatable.

It is among the objects of the present invention to produce an improved novel musk-like material of high effectiveness, which may be readily derived from the waste products obtained in the obtaining of fur from the American muskrat and which may be obtained in a high state of purity without adulteration and in high yield.

Another object is to provide an improved musk-like material which may be readily substituted for or used to replace with greater effectiveness the present types of synthetic musks, and/or natural musk as may be obtained from European musk deer or the Arctic musk ox, and which for many purposes will give rise to an enhanced musk odor and be devoid of undesirable characteristics and side odors which often develop in connection with natural or even synthetic musk.

Still further objects and advantages will appear in the more detailed description set forth below, it being understood, however, that this more detailed description is given by way of illustration and explanation only, and not by way of limitation, since various changes therein may be made by those skilled in the art, without departing from the scope and spirit of the present invention.

It has now been found that according to the present invention, the odoriferous glands of the American muskrat may be processed to produce a most effective and high powered musk-like material by simple solvent extraction procedures and/or with relatively simple chemical purification operations.

It has now been found that when these glands in their natural greasy and oily state may be readily processed by first converting them into a hard condition so that they may be readily powdered or subdivided, as by grinding, and they then may be successively treated with hydrophobe and then with hydrophile solvents, with or without a treatment with inorganic salts to remove certain precipitatable impurities and with a water treatment to remove residual fatty or non-water miscible materials.

Among the preferred fat solvents which may be employed are relatively low molecular weight hydrocarbon solvents, such as kerosene, benzine, hydrogenated naphtha, coal tar naphtha, benzene, toluene, xylene and other hydrocarbon derivatives of either coal tar or petroleum, preferably having boiling points below 150° C. and desirably below 75° to 100° C.

The preferred hydrophobe solvents for this purpose, however, are the ethers, such as petroleum ether, and less preferably alkyl ethers, such as ethyl ether, butyl ether or amyl ether.

Among the hydrophile solvents which may be employed following treatment with the hydrophobe solvents, are solvents such as methanol, ethanol, isopropanol, pentanol, acetone and less preferably, various water miscible esters, such as ethyl acetate. The preferred solvent of this nature is ethanol or ethyl alcohol, either absolute or a constant boiling point mixture.

In the preferred procedure, the material is first finely divided or shredded, preferably by freezing to a low temperature, at which it becomes rigid and may be ground, although other methods may be employed. This finely divided material then may be contacted with the hydrophobe solvent either by grinding or pulverizing it in the hydrophobe solvent, or by repeated treatments with the hydrophobe solvent or by percolating the hydrophobe solvent through a mass of the divided or ground material, which procedures may be carried out at a low temperature, if desired, to maintain the rigidity of the material.

The ethyl alcohol extraction may also be carried out at low temperature in a continuous manner or by a batch process, and the various alcohol extractions usually are bulked together, since in the alcohol extract is contained the essential ingredient which is responsible for the desirable odor to be produced.

The chemical constitution of this musk-like material is not known, but apparently its constitution has been changed as the result of the successive treatments of the glands with hydrophobe and hydrophile solvents, and it appears to be different in chemical constitution and chemical quality from the natural musk as may be produced from the European musk deer and Arctic musk ox, and it is also quite different in chemical composition from synthetic musks, which is a trinitrobutyl xylene.

After the alcoholic extraction has been carried out to remove all of the desired essential musk-like ingredients from the glands, the entire mass of extracted matter is bulked together and then evaporated.

When in substantially concentrated condition, the extract may be treated with water or with aqueous solutions of various salts, such as, for example, aluminum or zinc sulfate, which will cause a separation of the fat as an upper layer and the concentrated oily solvent solution of the musk-like material as a lower layer.

This lower layer then may be further concentrated to produce the musk-like material in solid form, or the musk-like material may then be used in liquid form and the residual musk material appears to have unexpected high perfume value and unusual stability and to be an excellent fixative in perfumes and highly resistant to the development of oxidative deterioration or undesirable side odors or side reactions when mixed with other perfume ingredients which may be utilized with musk bases.

To give one specific detailed procedure according to the present invention by way of illustration, but not by way of limitation, the glands which are about 1" to 2" in length as obtained from the American muskrat, which is a small water rodent, in greasy and oily condition, are first frozen to between 10° C. to 30° C. below zero, as with the use of solid carbon dioxide, to form a hard mass which is then ground and pulverized while still kept in frozen condition. These glands occur in pairs and are located in the skin right underneath the groin in the front of the anus.

It has been found that this procedure is much more satisfactory than shredding or hot filter pressing, or even much superior to grinding the animal tissues in the solvent which is subsequently to be utilized.

These glands then in frozen and ground condition are treated with petroleum ether or straight ethyl ether, to remove the fats and oily materials therefrom. From 50% to 95% of the fats and oils present may be removed in this manner.

If desired, two pints of the ether may be used for every quart of the gland material, and the extraction may be carried out by stirring up the gland material in a quantity of the ether or by causing the ether to percolate through the frozen finely divided glands in a continuous fashion.

The extraction may be carried out to remove all of the fat or only part of the fat, depending upon whether the presence of fat in the final musk-like material is objectionable.

For example, where the musk-like material is to be used in connection with perfuming of soap, the final musk-like concentrate obtained according to the present invention may contain substantial quantities of fat which will be converted in the soap-forming process into a soap material, which will disperse itself uniformly through the soap and hold the musk-like material most tenaciously throughout the body of soap and produce an improved soap not readily subject to oxidative deterioration and having an improved musk odor.

The fat extracted by the ether extraction, after recovery of the ether for re-use, also has a particular value in being mixed with ordinary soap, fats or tallow to be used in the manufacture of soap, since although it has removed only a small amount of the musk-like material, nevertheless such musk-like material is in particularly high effective condition in the fat or oily material.

After the fat extraction, the residual musk material, with or without freezing or the low temperature treatment, but preferably while being retained in frozen condition, is then subjected to prolonged alcoholic extraction, preferably in a vacuum or percolation with ethyl alcohol or mixtures of ethyl and propyl alcohols, which procedures may take place over night, and for each original quart of the glands successive quantities of two pint batches of ethyl alcohol may be utilized.

The ethyl alcohol should preferably contain less than 20% of water and desirably less than 5 to 10% of water. These four batches of alcohol of two pints volume each, are then bulked together and the musk-like material obtained may be derived from concentration of this bulked extract. This alcoholic extraction may be repeated a sufficient number of times, even as many as 5 to 6 times until all color is removed, and there is no color in the solvent.

It has often been found satisfactory to include in the last extractions small quantities of petroleum or ethyl ether. For example, in the last two pints of alcohol used in the fourth extraction, 20% of ethyl ether may be conveniently employed to make certain of the extraction of the last quantities of musk materials which may be present. The bulked material may then be evaporated, preferably at a vacuum at a relatively low temperature, until it has been reduced from say about 8 pints down to around 6 or 8 ounces more or less.

It then may be treated with water to separate the fats out as a separate layer, with the fats floating on top of the water and the musk concentrate settling under the water, and/or it may be treated with an aqueous solution of zinc sulfate or aluminum sulfate to remove solids.

For example, after the bulked material has been evaporated down to 6 or 8 ounces, an equal quantity or double or triple volume of water or a 5 to 10% solution of aluminum sulfate or zinc sulfate may be added and then after thorough agitation and settling, the water and impurities may be decanted and drawn off, leaving the final musk-like concentrate, which may be then evaporated to dryness or dried in the air to produce a highly effective musk-like material.

In all of the recovery of the solvent, this is preferably done at a low vacuum and low temperature so as to assure maximum recovery of solvent and at the same time prevent any other undesirable change or modification in the musk material which is obtained.

The final concentrate may be readily dissolved in amount of 1 ounce to nine ounces of alcohol or cologne spirits to give a most effective musk solution which is highly desirable as a perfume material.

The product besides having a powerful fixative action, also has a distinctive odor of its own. It thus gives a decidedly different effect in the final perfume than is obtained from musk derived from the musk deer or artificial musk, which has no chemical similarity to natural musk from the deer species.

Although the present invention has been particularly described in its application to the treatment of musk glands, it has also been found applicable to the extraction of other similar materials from animal glands and tissues, such as fatty containing sacks or materials derived from skunk, mink, civet and other musk-like bearing animals, which are mixed with large amounts of fatty materials and which are more or less soluble in hydrophile organic solvents.

As many changes could be made in the features and details, and many apparently widely different embodiments of this invention could be made without departing from the scope thereof, it is intended that all matter contained in the above description shall be interpreted as illustrative and not in a limiting sense.

What is claimed is:

1. A process of obtaining a musk-like material from the greasy, oily, odoriferous glands of the American muskrat, which comprises removing the fat from the glands with a water immiscible fat solvent, then extracting them with alcohol, concentrating the alcoholic extract and precipitating the impurities from the concentrated alcoholic extract with an aqueous solution of a water soluble aluminum sulfate.

2. A process of obtaining a musk-like material from the greasy, oily, odoriferous glands of the American muskrat, which comprises freezing the glands with solid carbon dioxide at between 10° to 30° C. below zero, pulverizing the glands while in frozen condition, extracting from 50% to 95% of the fats and oils present with petroleum ether, using about two pints of ether for about every quart of the glands, repeatedly extracting the glands after the removal of the fat with successive treatments with ethyl alcohol substantially free of water, each of the treatments utilizing about two pints of alcohol for each original quart of glands, bulking together the various alcohol extracts and concentrating, purifying the concentrated alcohol extract by stirring with an aqueous solution of aluminum sulfate to precipitate impurities therefrom and then evaporating to dryness.

3. A process of obtaining a musk-like material from the odoriferous glands of the American muskrat, which comprises freezing the glands and powdering them while in frozen condition, then while in frozen condition extracting the fats therefrom with a water immiscible fat solvent and thereafter extracting the glands with ethyl alcohol and purifying the ethyl alcohol extract by precipitating it with aluminum sulfate.

4. A process of obtaining a musk-like material from the greasy, oily, odoriferous animal glands, which comprises treating said glands in pulverized condition first with hydrophobe and then with hydrophile solvents, said hydrophobe solvent being a water immiscible low molecular weight ether, and said hydrophile solvents being selected from the group consisting of the water miscible low molecular weight mono-hydric alcohols, ketones and esters.

5. A process of obtaining a musk-like material from the greasy, oily, odoriferous animal glands, which comprises treating said glands when in frozen pulverized condition first with hydrophobe and then with hydrophile solvents, said hydrophobe solvent being a water immiscible low molecular weight ether, and said hydrophile solvents being selected from the group consisting of the water miscible low molecular weight mono-hydric alcohols, ketones and esters.

6. A process of obtaining a musk-like material from the greasy, oily, odoriferous glands of the American muskrat, which comprises treating said glands when in frozen pulverized condition first with a water immiscible fat solvent and then with a water miscible organic solvent selected from the group consisting of the low molecular weight, water miscible, mono-hydric alcohols, ketones and esters.

7. A process of obtaining a musk-like material from the greasy, oily, odoriferous glands of the American muskrat, which comprises treating said glands in pulverized condition with petroleum ether to remove the fat therefrom, and then with alcohol to remove the musk-like material therefrom.

8. A process of obtaining a musk-like material from the greasy, oily, odoriferous glands of the American muskrat, which comprises freezing and grinding the glands, then treating them with petroleum ether to remove the fat materials therefrom and then with ethyl alcohol to remove the musk-like materials.

CHARLES V. SPARHAWK.